T. J. FREEMAN.
Stalk-Chopper.
No. 31,928. 924. Patented Apr. 2, 1861.
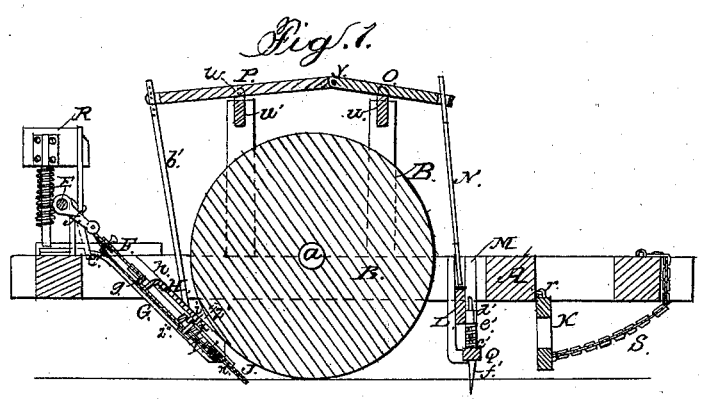
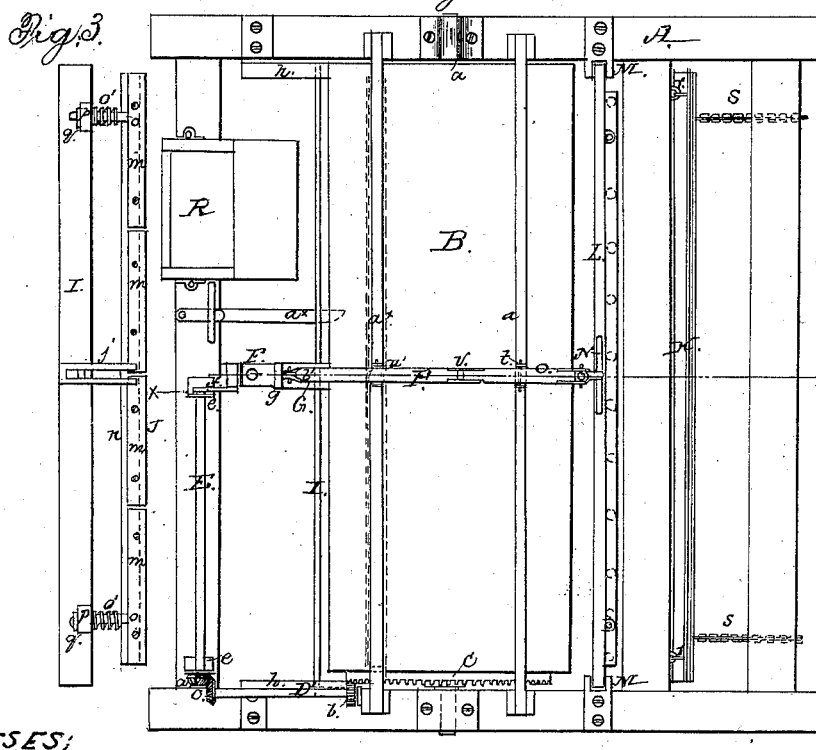
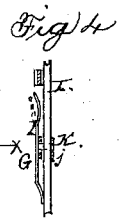
WITNESSES:
INVENTOR:

UNITED STATES PATENT OFFICE.

T. J. FREEMAN, OF HEYWORTH, ILLINOIS, ASSIGNOR TO HIMSELF AND E. T. FREEMAN, OF SAME PLACE.

IMPROVED MACHINE FOR CUTTING STANDING CORNSTALKS.

Specification forming part of Letters Patent No. 31,928, dated April 2, 1861.

*To all whom it may concern:*

Be it known that I, T. J. FREEMAN, of Heyworth, in the county of McLean and State of Illinois, have invented a new and Improved Machine for Cutting Standing Cornstalks; and I do hereby declare that the following is a full, clear, and exact description of the same, reference being had to the annexed drawings, making a part of this specification, in which—

Figure 1 is a side sectional view of my invention, taken in the line $x$ $x$, Fig. 2; Fig. 2, a plan or top view of the same; Fig. 3, a detached front view of the knife and parts intimately connected therewith; Fig. 4, a section in the line $z''$ $z''$, Fig. 1.

Similar letters of reference indicate corresponding parts in the several figures.

This invention consists in the employment or use of a roller placed in a suitable frame, and used in connection with a reciprocating yielding knife, a frame for bending over the corn, and a reciprocating toothed plunger, the parts being constructed and arranged essentially as hereinafter fully shown and described, whereby the desired work may be expeditiously and perfectly performed.

The object of the invention is to cut down the standing stalks so that the same may be plowed under the soil and made to enrich the same, the invention superseding the ordinary manual operation, as well as machines hitherto devised for the purpose that have passed under my observation.

To enable those skilled in the art to fully understand and construct my invention, I will proceed to describe it.

A represents a rectangular frame in which a roller, B, is placed, formed of two parts, one of which is placed loosely on a common shaft, $a$, and the other connected thereto in order to facilitate the turning of the machine.

To the outer end of one of the parts of the roller B there is attached a toothed wheel, C, which gears into a pinion, $b$, on the front end of a shaft, D'. The back end of this shaft D' has a bevel-pinion, $c$, on it, and this pinion gears into a similar pinion, $d$, on a shaft, E, which is fitted in bearings $e$ on the back part of the frame A. The inner end of shaft E has a crank, $f$, attached, and this crank is connected to a compensating or extension pitman, F, the front end of which is connected by a joint, $g$, to a slotted bar, G, which has a bent bar, H, attached to its upper surface. The two bars G H embrace a traverse-piece, I, the ends of which are fitted in inclined guides $h$ $h$, attached to the sides of the frame A. The front end of the bar H has a pendent pin, $i$, attached to it, and this pin fits in a slotted plate, $j$, attached to the upper surface of the traverse-piece I, the pin $i$ of the bar H being between the upper edge of the slot of plate $j$ and a pin, $k$, which is attached to a spring, $l$, and passes through the traverse-piece I.

J represents a knife, which is formed of sections $m$, screwed to a plate, $n$, which has rods $o$ $o$ attached to its upper surface, said rods passing through eyes $p$, attached to the traverse-piece I, and having nuts $q$ on their upper ends. (See Fig. 3.) The knife J, it will be seen by referring to Fig. 1, is immediately behind the roller B. The rods $o$ have spiral springs $o'$ on them.

To the front end of the frame A there is attached, by joints or hinges $v$, a frame, K, which extends the whole width of frame A, and has chains $s$ attached to its front side, said chains serving as stays to prevent the backward swinging movement of the frame. (See Figs. 1 and 2.)

In the front part of the frame A, directly in front of the roller B, there is placed a sliding bar, L. The ends of this bar are fitted in vertical guides M M, attached to the sides of the frame. The bar L is connected by a rod, N, with the front end of a lever, O, the fulcrum $t$ of which is on a traverse-bar, $u$. The back end of the lever O is connected by a loose joint, $v$, with a lever, P, which has its fulcrum-pin $w$ on a traverse-bar, $a'$, and the back end of lever P is connected by a rod, $b'$, with the traverse-piece I. (See Fig. 1.)

To the bar L there is attached, by rods $c'$, a bar, Q, the rods $c'$ being fitted in eyes $d'$, attached to bar L, and the rods having spiral springs $e'$ on them, which admit of bar Q having a yielding movement. In the bar Q there are driven a series of teeth or spikes, $f'$.

The operation is as follows: As the machine is drawn along a reciprocating motion is given the knife J and toothed bar Q, the frame K bends over the standing cornstalks, and as the roller B passes over them the knife J cuts them, the knife acting just back of the line of the pressure of the roller. The toothed bar Q serves as an indicator to point out the presence of rocks, and thereby warn the driver on his seat R, who can stop the machine or disconnect the traverse-piece I from the pitman F by throwing down the pin $k$, which is done by depressing the outer end of spring $l$ by means of a lever, $a^*$, or other proper means.

The knife J, in case of coming in contact with stones or other obstructions, is in consequence of the springs $o'$ allowed to yield or give, and the bar Q is allowed to yield in the same way and for the same purpose.

Having thus described my invention, what I claim as new, and desire to secure by Letters Patent, is—

1. The roller B, in connection with the reciprocating knife J, arranged for joint operation, as and for the purpose herein set forth.

2. The combination of the roller B and reciprocating knife J with the toothed plunger-bar Q and frame K, all being placed within a frame, A, as and for the purpose specified.

3. The peculiar arrangement of the bars G H with the plate $j$ and pin $k$, essentially as shown, whereby the pitman F may be readily connected to the traverse-piece I, and readily disconnected therefrom, for the purpose of rendering the knife operative or inoperative, as required.

T. J. FREEMAN.

Witnesses:
  WM. WEYANER,
  H. S. HERR.